United States Patent [19]
Beni et al.

[11] 4,417,786
[45] Nov. 29, 1983

[54] DEVICES BASED ON SURFACE TENSION CHANGES

[75] Inventors: Gerardo Beni, Old Bridge; Susan Hackwood, Freehold, both of N.J.

[73] Assignee: Bell Telephone Laboratories, Incorporated, Murray Hill, N.J.

[21] Appl. No.: 272,490

[22] Filed: Jun. 11, 1981

Related U.S. Application Data

[63] Continuation-in-part of Ser. No. 236,113, Feb. 19, 1981, abandoned.

[51] Int. Cl.$^3$ ................................. G02F 1/29
[52] U.S. Cl. ................................. 350/359; 350/312; 350/362; 350/486
[58] Field of Search ............... 350/267, 359, 285, 362, 350/312, 315

[56] References Cited

U.S. PATENT DOCUMENTS 4,160,141 7/1979 Graf .................................... 350/267

*Primary Examiner*—William L. Sikes
*Assistant Examiner*—Léon Scott, Jr.
*Attorney, Agent, or Firm*—Bruce S. Schneider

[57] ABSTRACT

An optical change in a device is produced through modification of the surface tension between two materials by the change of an electric field. For example, such a device is formed by introducing an electrolyte and a metal such as mercury into a capillary tube. The surface tension between the two fluids is changed through application of a voltage between them. When the surface tension is altered the relative positions of the fluids in the tube also change. Thus, it is possible to introduce one fluid into a portion of the tube which contained the other before the change in voltage, i.e., the position of the interface between the fluids, is moved. If the two fluids have different colors, the translation produces a color change if the area of the tube near the initial interface position is viewed.

12 Claims, 3 Drawing Figures

DEVICES BASED ON SURFACE TENSION CHANGES

CROSS-REFERENCE TO RELATED APPLICATION

This application is a continuation-in-part of copending and now abandoned application, Ser. No. 236,113, filed Feb. 19, 1981 which is hereby incorporated by reference.

BACKGROUND OF THE INVENTION

1. Field of the Invention

This invention relates to devices that undergo an optical change and, in particular, devices that undergo an optical change due to application of an electric field.

2. Art Background

Many classes of devices that undergo a color change upon application of a voltage have been extensively investigated. For example, light-emitting diodes and liquid crystal devices are now widely used in a variety of products. Despite the predominant use of light-emitting diodes and liquid crystal devices many other classes of devices that undergo an optical change are being investigated. This continued investigation indicates the tremendous demand for such devices.

One type of device presently being investigated is based on the electrophoretic effect. In these devices a white material is suspended in a colored supporting medium. For example, white pigmented particles are suspended in a blue liquid. The medium with its suspended particles appears to be blue. However, the particles are chosen so that they respond to an electrostatic charge. Such a charge is developed on the electrodes. This charge attracts the white particles that, in essence, plate the area where the complementary charge is located and cause the cell to appear white. Initially, these devices seemed promising because of their pleasing esthetics. However, use of electrophoretic is quite limited since there is a tendency for the suspended particles to flocculate or to precipitate. Thus, the life of these devices are typically too short for many applications. Additionally, relatively large potentials, e.g., approximately 30 V or greater, are necessary to attain response times of 100 msec. or less.

Although some devices have generated only modest interest for display applications, others have had phenomenal commercial success. Research for other suitable device configurations is thus still being vigorously pursued.

SUMMARY OF THE INVENTION

A new class of devices that undergo an optical change upon application of an electrical field and that have desirable stability is based on the modification of the surface tension interaction between materials. The surface tension is modified by the application of an electrical field. This modification is produced by utilizing a configuration that allows charge storage at an interface due to application of the field. The charge storage at the interface between materials modifies the surface tension interaction of these materials. When the surface tension interaction is sufficiently modified a force is produced that causes movement. This movement is then utilized as the basis for a perceived color change.

Exemplary of such devices are those based on a capillary tube that is partially filled with two fluid media. A voltage is applied between the two media, e.g., one chosen to be an ionic conductor such as an electrolyte and the other an electronic conductor such as a metal, e.g. mercury. Since the two fluids conduct charge through movement of different charge carriers, i.e., ions and electrons, respectively, no substantial charge passes between them provided that an electrochemical reaction is avoided. However, a capacitor is formed and charge is stored. This storage of charge at the interface causes the fluid media to move in the tube.

An optical change is then produced through the induced movement by a variety of expedients. For example, in the previously described embodiment, it is possible for an observer to look at the portion of the capillary tube which is initially occupied by the electrolyte and see a transparent, colorless medium. An applied voltage is then changed to induce movement of the metal, e.g. mercury, into the observation region. Therefore, the portion of the capillary tube being observed has the silver color of mercury. Additional devices are producible that employ an optical change from reflective to transparent, e.g., the transparent electrolyte to the reflective mercury. Such a device is useful for controlling the path of light.

The subject devices are stable. Additionally, it is possible to induce optical change in time periods on the order of 1 msec. The voltage utilized to induce these color changes generally is not excessive and typically requires 1 V. Thus, a stable device that does not require excessive power consumption and that undergoes a relatively rapid optical change is producible based on the modification of surface tension.

DETAILED DESCRIPTION

Figure 1:
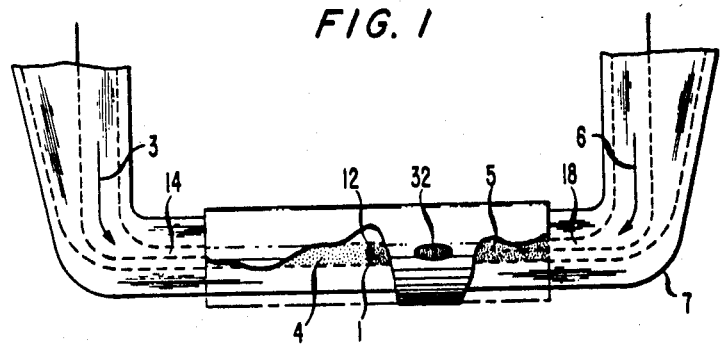
FIGS. 1, 2 and 3 illustrate principles on which the invention is based.
Figure 2:
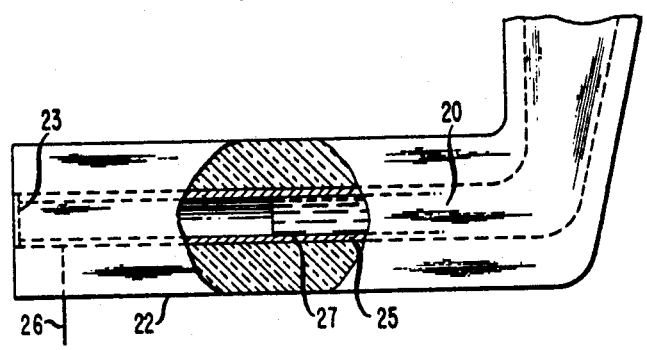

The devices of the subject invention depend on the electrical modification of the surface tension between two media. This modification generally occurs in a multimedia configuration. As shown in FIG. 1, for example, the media constituting the device include the interaction media 4 and 5, a vessel 7, defining the boundary of the device, and the environment regions 14 and 18. More complex devices are possible that rely on further media and these more complex situations are not precluded. However, for pedagogic purposes, initially the invention will be described based on configurations such as shown in FIGS. 1 and 2.

Surface tension interactions are possible, for example, between (1) interaction media 4 and 5, and (2) between each interaction media and the vessel 7. A potential is applied or changed in order to modify the surface tension between two of these media. For example, in the case of FIG. 1, a voltage is applied between interaction medium 4 and interaction medium 5. This is done, for example, by utilizing an electrolyte, e.g., 0.1 M KCl, for medium 4 and an electronic conductor such as a metal, e.g. mercury, as the medium 5. Similarly, in FIG. 2 a charge is applied between medium 20 and the vessel 22. This is done, for example, by utilizing an electrolyte for medium 20 and by metallizing the inside of the vessel so that it is possible to apply a potential to it through, for example, lead 26. In the case of FIG. 1, the surface tension interaction at interface 12 is modified. In the case of FIG. 2, the surface tension at interface 27 is modified.

As discussed previously, in order to induce a modification of surface tension a charge should be stored at the interface where the modification is desired. To store this charge a capacitor should be formed. Obviously, if substantial current flows between the two materials that form the interface, a substantial charge will not be stored. Therefore, the use of materials that allow a ready transfer of charge across the interface is not appropriate. (Since electrochemical reactions are generally undesirable and do allow charge flow, the materials used at the interface should preferably be chosen so no electrochemical reaction occurs during operation.)

Thus, what is desired is a polarizable interface. A preferred method of forming a polarizable interface is through the use of an ionic and electronic conductor. For example, in the case of FIG. 1, the suitable interacting media are respectively an ionic conductor, such as an electrolyte, and an electronic conductor, such as a metal. As long as the ionic conductor has an ionic transference number essentially equal to one and the electronic conductor has an ionic transference number essentially equal to zero (corresponding to electronic transference number essentially equal to one) substantial charge flow is avoided. (Ionic and electronic transference numbers are defined as the fraction of the total electrical current carried by a particular carrier species—ions, irrespective of chemical composition, in the former case, and electrons and holes in the latter.) The electrolyte conducts through ionic species and the metal conducts through electrons. Therefore, current flow between the two is not significant. In this manner, a capacitor is formed at an interface. Similarly, in FIG. 2, the metal on the containing vessel 25 and the electrolyte conduct through different species and thus do not transfer charge. Use of media which are mixed ionic and electronic conductors, i.e., a transference number other than 0 or 1, is not precluded provided the interface between these materials provides a sufficient barrier to charge flow. (It is possible to employ interfacing materials that conduct through the same class of charge carrier, e.g., both conduct through ionic species, provided a material is interposed between the two to establish a capacitor and to prevent substantial charge flow.)

Generally, an interface provides a sufficient barrier provided the voltage drop across the barrier is at least 0.01 V, preferably at least 0.1 V. Since the size of the energy (per unit area) altering the surface tension is $\frac{1}{2}CV^2$ where V is the voltage drop and C is the capacitance per unit area, the size of the desired voltage drop depends on C. As discussed below for typical C and for typical magnitude of surface tension, i.e., $10^2$ ergs/cm$^2$, the voltage drops given are appropriate. However, a radically smaller C or radically larger surface tension requires a larger voltage drop.

The media to which the electrical potential is applied should have a sufficiently low resistance so that excessive power is not lost. Typically, ionic conductors for the device geometry used should have resistances less than $10^7$ ohms, preferably less than $10^6$ ohms, and electronic conductors for the device geometry used should have resistances less than $10^7$ ohms, preferably less than $10^6$ ohms. Electrical contact to a fluid medium such as a liquid electrolyte or to a solid medium such as a metallization layer is made through conventional techniques. For example, contact to a fluid electrolyte or fluid metal is made by a Pt electrode. Contact to a metallization layer is made also through the typical expedient of indium solder coated with an insulating material.

The capacitance of the interface also determines the extent of charge that is stored and, thus, affects the magnitude of the change in the surface tension resulting from a change in applied voltage. The magnitude of surface tension change for a given device configuration in turn determines the degree of resultant movement. Typically, the greater the change in stored charge that is producible, the greater the force available to promote translation movement through change of surface tension interactions. For typical device configurations, the capacitance of the interface should be greater than 0.1 $\mu F/cm^2$, preferably greater than 1 $\mu F/cm^2$. (Capacitance of the interface is measurable by standard techniques, such as described in J. O'M. Bockris and A. K. N. Reddy, *Modern Electrochemistry*, Plenum Press, N.Y. (1970).)

The extent of movement of the device media depends not only on the change induced in the surface tension, but also on the forces exerted on the interface where the surface tension is to be modified. These forces are developed either by the environment media 14 and 18 in FIG. 1 or by the interaction media themselves. For example, in FIG. 1, a pressure indicated by arrow 3 and a pressure indicated by arrow 6 are exerted on each side of the electrolyte/metal interface. Such a pressure may be atmospheric pressure, the vapor pressure of medium 4 or 5 itself if the vessel is sealed, the pressure of a vacuum, the weight of the medium 4 or 5 when the device is in a vertical configuration, or a multitude of other forces exerted on the interface. (It should be noted that an interaction medium also may be the source of its own environment, e.g., the medium generates a vapor that exerts a pressure.)

To produce a perceived optical change, the voltage applied to the device is controlled to, in turn, influence the relative positions of the media constituting the device. In the operation of the device a potential is applied to maintain a desired initial configuration of the media constituting the device. For example, a potential is applied to maintain the interface 12 at position 1 on the vessel. (It is possible this voltage is zero due to the environment forces involved.) The position of a medium of the device is then altered through a change in the applied voltage and, thus, a change in surface tension. The new equilibrium position after the change in voltage naturally depends on the difference in the forces exerted by the environment and on the magnitude of change induced in the surface tension. The size of the voltage change necessary for a given relative movement of the device medium obviously depends on the device configuration and the medium utilized. Typically, voltage change in the range 0.1 V to 10 V, preferably 0.1 V to 1 V are utilized. A control sample is employed to determine an appropriate voltage change for a given configuration and constituent components.

The change of relative position should be sufficiently large so that an expedient is available for converting this change into a perceived optical modification. Various such expedients are possible. For example, a viewing port is made so that only one portion 32 is viewed. The initial equilibrium is established so that medium 5 occupies this area. After change of a voltage, the translation induces medium 4 to occupy this area. The two media are chosen to have different optical properties. (For example, different colors are either inherent in the nature of the material themselves or through the use of color modifiers, such as dyes, to produce the desired color.) As the occupying medium of the viewing area shifts the color also changes.

Alternatively, the vessel, such as a straight capillary tube, is configured so that it is viewed from the end, lengthwise down the tube with the end opening having a diameter in the range 10 to 100 $\mu$m. Initially, the fluid 20 in FIG. 2, does not fill the end 23 of the capillary tube 22. Because there is a large change in refractive index at the surface of the capillary tube from the environment to the material of the tube, the tip appears frosted. The applied voltage is changed so that the medium 20 fills the end of the tube. The medium 20, e.g., a 0.001 M solution of KI in a 50:50 by volume mixture of water and dimethyl formamide, is chosen so that its refractive index matches that of the vessel. Thus, when the medium occupies the end of the tube, it appears clear. The perceived optical change is from frosted to clear. Obviously, numerous other means for changing the color due to a change in relative configuration of the device is possible.

Although the preceding description has been in terms of somewhat less complex configurations, other device geometries although more complex are also advantageous. For example, the device shown in FIG. 3 requires only a small operating voltage, e.g., a change of voltage from 0 volts to 1 volt and affords extremely short response times. In one embodiment, it is possible to move the interaction medium, such as mercury, 43, shown in FIG. 3, a distance of 0.5 mm in a time period of as little as 5 msec. This embodiment of the invention is formed by inserting a medium that has, for example, an electronic conductivity into a vessel such as a capillary tube, 40. The electronically conducting interaction medium is then surrounded by an ionically conducting medium, 53, such as an electrolyte, e.g., an aqueous salt solution or a salt in a non-aqueous solvent such as dimethylformamide to form the desired polarizable interface. The electronically conducting medium is chosen so that its cross-sectional dimensions are smaller than that of the bore of the capillary tube. In this manner electrolyte, 53, is interposed between the electronically conducting medium and the walls of the vessel.

When a voltage is applied, for example to electrodes 47 and 45, a current initially flows through the electrolyte, 53. Since the cross-sectional dimensions of the electrolyte in region 41—the region interposed between the vessel walls and the electronically conducting medium—is relatively small, it presents a relatively high resistance to the flow of current. A substantial voltage drop across the dimensionally small portion of electrolyte occurs due to this high resistance. While current flows through the system, charge is simultaneously being stored at the electrolyte/electronically conducting medium interface. This charge storage continues until the current ceases when the device becomes completely polarized. The amount of charge stored is less than that stored in previously described embodiments since a resistance—the electrolyte in the region 41—is in parallel with the polarizable interface formed between the medium 53 and 43.

Because there is a voltage drop across electrolyte region 41, the charge stored at the interface 51 on one side of this voltage drop is smaller than the charge stored at the interface 50 on the other side. Therefore there is a difference in the magnitude of the surface tension at interface 51 as compared to that at interface 50. (It is possible in rare circumstances that the variation of the surface tension upon charge storage for a given choice of reaction media is a parabolic dependence that is symmetric around the zero of voltage. In such rare instances a substantial effect does not occur. A small material change such as change of the ionic concentration in the electrolyte in turn changes the dependence of surface tension on charge and thus eliminates this undesirable situation.) This induced difference in the surface tension across the electronically conducting medium causes its movement. The direction of movement, either towards the positive or towards the negative electrode depends on the materials utilized. For mercury and an aqueous electrolyte if the current flows in the direction indicated by the arrow in FIG. 3, a greater charge is stored at interface 51 then at interface 50. This greater charge leads to a relatively smaller surface tension which in turn induces a movement of the electronically conducting medium in the direction of the current flow. (Obviously in a sealed, filled vessel the movement of the electronically conducting medium is compensated for by a movement of the electrolyte in the opposite direction.) To reverse the direction of movement the polarity of the current is also reversed. The resulting control of movement is utilizable as described above to produce a desired optical change in the given region of the vessel.

A configuration is also possible where reaction medium 43 touches the walls of the vessel around its perimeter so that a continuous current path is not obtained across the electrolyte. Upon application of a voltage, current initially will flow to charge in effect what is a capacitor and the same sequence of events as previously described occurs. However, in this situation different forces are present. There is a larger charge-storage difference, and thus, a larger surface tension difference across the medium, 43, due to the absence of an alternate ionic conduction path such as that region of electrolyte denominated by 41 in FIG. 3. This larger difference favors a greater induced velocity. In opposition to the force created by the surface tension difference is the frictional force between the interaction medium and the vessel. This frictional force is typically greater than the small frictional force between two interaction media, 43 and 53 in the previously described embodiment. Additionally, the difference in surface tension induces the electrolyte and the electronically conducting medium to move in opposite directions. This induced counter movement is resisted by the physical barrier to movement of the electrolyte formed by the contact between the electronically conducting interaction medium and the vessel. The resistance produces a force opposing the desired movement. If the incremental force produced by the added stored-charge difference is greater than the incremental forces produced by the friction and counter-movement effects, there is a net benefit relative to the device of FIG. 3 achieved from using a medium that contacts the vessel and separates two regions of a second interaction medium. Typically, however, frictional forces favor the use of non-contacting configurations.

In either case, the more complicated configurations, upon analysis, depend upon the same principle as the other previously described, less complex configurations. An electric field is introduced across the device; this field causes a change in surface tension which, in turn, induces a movement. For example, in the non-contacting embodiment, the movement causes the electronically conducting medium to move within the fluid medium of the electrolyte. Thus, since the electronically conducting medium moves through the electrolyte, a compensating movement by the electrolyte is also induced.

Figure 3:
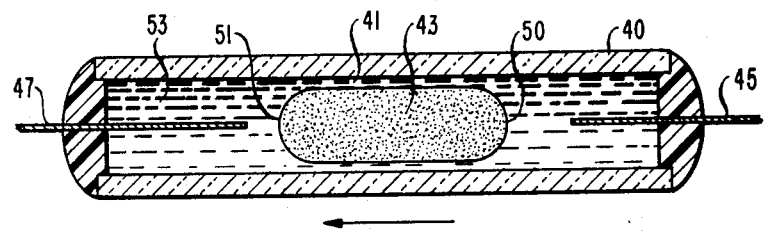

As discussed, since frictional forces substantially reduce the freedom of movement of the electronically conducting medium, it is desirable to construct the device shown in FIG. 3 so that high frictional forces are avoided. For example, a suitable choice for the reaction medium 43, is mercury or liquid gallium. Alternatively, a metal in the solid phase is also employable. However, for most metals it is difficult to precisely size the metal dimensions so that excessive frictional forces between the solid phase metal and the vessel walls are not present. To alleviate this problem it is possible to form a mercury amalgam on the surface of a solid metal by immersing the metal in mercury. The amalgamated surface presents a significantly reduced frictional force to the walls of typical vessel materials such as glass. However, the use of an unamalgamated metal is not precluded provided the materials and dimensions are suitably controlled so that excessive frictional forces are not produced.

Obviously, the less viscous the electrolyte the greater the translational momentum induced in the electrically conducting medium for a given applied voltage. The cross-sectional dimension of the vessel also affects the momentum induced. The smaller the cross-sectional area the less the mass of the electrically conducting medium and therefore the greater the velocity produced for a given applied voltage. (The increase in velocity, in practice is not linear with decrease in cross-sectional dimension.) For example, a capillary tube having a cross-sectional dimension of 200 microns by 1 mm allows the production of a velocity of 2.5 cm/sec by a mercury slug of dimensions 1.0 mm×1.0 mm×200 $\mu$m for a 1 volt applied voltage. A capillary tube with a 50 microns by 0.5 mm cross-sectional dimensions, in comparison, under the same condition allows the production of 10 cm/sec velocity by a mercury slug of dimensions 0.5 mm×0.5 mm×50 $\mu$m.

The resistivity of the interaction medium, 53, generally should be in the range from 10 to 100 ohm/cm. Smaller resistivities in the non-contacting configuration typically allow insufficient charge storage. Larger resistivities require excessive voltage to induce current flow to charge the device. (If the contacting interaction medium configuration is employed, the lower limit of 10 ohm/cm is unimportant since there is substantially no continuous current path provided by the electrolyte and, as a result, there is no ionic conduction path such as region 41 in FIG. 3 to diminish charge storage.)

The following examples are illustrative of the preparation and operation of devices within the subject invention:

EXAMPLE 1

A capillary tube having a bore diameter of about 3 mm and having a wall thickness of approximately 1 mm was cleaned with isopropanol, was heated, and was bent into a U-shape configuration. The openings at the arms of the U were then flared so that the opening diameter was approximately 1 cm and this diameter extended approximately 3 cm down the arms of the tube. The area across the bottom of the U was then heated and this central portion was pulled to form an area of the tube that had a bore diameter of approximately 0.5 mm and a length of approximately 10 cm. The structure produced was then cleaned with isopropyl alcohol. This cleaning was accomplished by placing the isopropyl alcohol in one of the flared sections and drawing the alcohol through the tube using a vacuum applied to the other flared opening. The structure was then dried in an air oven at a temperature of approximately 60 degrees C.

Triply distilled mercury was poured into one of the flared openings. This induced mercury from the flared opening to flow into the centrally drawn region and to continue into the other flared opening. As the mercury filled the structure, more mercury was added to maintain the supply.

An electrolyte solution of 0.1 M KOH was prepared by dissolving analytical grade KOH in deionized water. This electrolyte was introduced at one of the flared openings. Suction was applied to the other flared opening which caused the mercury/electrolyte interface initially at one flared opening to migrate toward the source of the vacuum. As this migration progressed, KOH solution was added to the flared opening where the interface started to maintain an adequate supply. The vacuum drawing was terminated when the interface between the electrolyte and the mercury was approximately in the center of the constricted portion of the capillary tube.

Platinum foils approximately 2 cm long and 1 cm wide were used as the electrodes. A copper wire was spot-welded to each of these foils. A saturated calomel electrode and one of the platinum electrodes was inserted into the appropriate flared portion so that they were immersed in the KOH electrolyte. The remaining platinum electrode was inserted in the other flared arm so that it was immersed in the mercury. (A standard calomel electrode was initially employed solely as an experimental expedient for investigating device properties. However, such electrode is not necessary for an operating device.) A sufficient voltage was applied between the two platinum electrodes so that a voltage of 0.3 V versus the standard calomel electrode was established. (Without the use of a calomel electrode, the application of approximately 1 V between the two platinum electrodes yields approximately the same effect.) This applied voltage resulted in the movement of the mercury/electrolyte interface of approximately 5 cm. By restricting the view of the constricting portion of the capillary tube to a portion just to one side (in the direction of the movement to be induced) of the initial position of the interface, a change in color was clearly perceived upon the change of voltage from 0 to 0.3 V versus the standard calomel electrode.

EXAMPLE 2

A capillary tube 8 cm in length and having an opening of 1.25 mm in diameter was cleaned by successively washing in trichloroethane, acetone, methanol, chromic acid, and distilled water. The capillary tube was then boiled in methanol for about 5 minutes and air dried.

A syringe was filled with a 0.1 M solution of $H_2SO_4$. The syringe was utilized to inject the sulfuric acid into the capillary tube and thus, to form a 5 cm long region of sulfuric acid. A second syringe was filled with mercury and a 0.5 cm long slug of mercury was injected into the center of the 5 cm long electrolyte medium. Platinum electrodes that extended 1.5 cm into the capillary tube and that had a 0.25 mm diameter were sealed with an epoxy composition into each end of the capillary tube. In this configuration the mercury was surrounded by the electrolyte which in turn interfaced with a region of air and vapor from the sulfuric acid.

A square wave potential with extrema at −1 and 1 volt and period of 200 msec was applied to the electrodes. For this applied potential the mercury had an induced velocity of 10 cm/sec which reversed direction in 100 msec, with the vector of the velocity in direction of the negative electrode.

EXAMPLE 3

A capillary tube was prepared as described in Example 2 except a 5 cm long capillary tube having an opening with a 200 micron by 1 mm rectangular dimension was employed. Heat-shrink tubing was placed on either end of the capillary tube. The mercury was introduced into one of the heat-shrink tubes and completely into the capillary tube by using a syringe. The syringe in the heat-shrink tubing was then filled with 0.1 M sulfuric acid. The capillary tube with its attached heat-shrink tubes was submerged in 0.1 M sulfuric acid and the acid was forced into the capillary tube displacing all but 0.5 mm of the mercury by applying pressure to the syringe. The pressure was then reversed and 0.1 M sulfuric acid was drawn up into the capillary tube to yield a slug of mercury 0.5 mm long completely surrounded by electrolyte. Platinum electrodes were inserted into each heat-shrink tube. The heat-shrink tubes were filled with 0.1 M sulfuric acid and sealed by applying a temperature of approximately 60 degrees C. For the same applied voltage as described in Example 2 a velocity of approximately 10 cm/sec was achieved.

EXAMPLE 4

A thin walled and thus transparent Teflon tube with an internal core of 1.5 mm in diameter was filled with about 10 mg of Ga. (The tube was cleaned as described in Example 2 without the use of chromic acid.) This was accomplished by inserting Ga chips into the tube and subsequent heating the tube to a temperature of about 30 degrees C. The gallium was, in this manner, converted to a liquid and remained a liquid even at 0 degrees C. About a 3 cm long region of 0.1 M sodium sulfate was inserted into the capillary tube on both sides of the gallium. Platinum wires were inserted into the electrolyte on both sides of the gallium. Initially a square wave voltage of 9 V amplitude and a pulse rate of 100 msec was applied to form a well defined gallium slug. Then a square wave voltage varying between 4 V and −4 V with a pulse rate of 100 msec was applied and produced a net displacement of about 0.4 mm with a direction reversal every 100 msec.

EXAMPLE 5

A glass tube with a bore of 1.25 mm in diameter was cleaned as described in Example 3. A pellet of gold of dimension of slightly less than 1.25 mm in diameter (about 100 $\mu$m less in diameter than the core of the tube) and 4 mm in length was cleaned by immersion in concentrated nitric acid for about 2 minutes. (The pellet was obtained by heating and drawing a larger pellet until the midsection was of the correct diameter and this section was cleaved from the remainder of the gold body.) The pellet was submerged in mercury for about 10 minutes. The excess mercury was removed by abrasion with fine aluminum oxide abrasive paper. The pellet was washed sequentially in methanol and distilled water and inserted into the tube. Sulfuric acid and platinum electrodes were then added as described in Example 4. A square wave voltage varying between −1 volt and 1 volt with a period of 50 msec was applied. The gold translated in each direction about 0.7 mm in the 50 msec time period.

What is claimed is:

1. A device comprising a vessel, a fluid medium, means for applying an electrical potential and a means for observing an optical change induced by a change in said potential characterized in that said device includes an interface capable of storing charge and formed between said fluid medium and a second element which is in intimate contact with said medium, said second element comprises a material which allows said interface to be polarizable wherein said fluid medium is capable of movement, whereby upon a suitable change of said electrical potential applied to said interface through said means for applying an electrical potential, said movement of said fluid is induced by an induced change in surface tension and said optical change results.

2. The device of claim 1 whereby said means for applying a potential comprises an electrode.

3. The device of claim 1 including a second fluid medium.

4. The device of claim 3 whereby said fluid medium comprises an electrolyte and said second fluid medium comprises a metal.

5. The device of either claim 3 or 4 wherein said vessel comprises a capillary tube.

6. The device of claim 4 wherein said electrolyte comprises an aqueous KOH solution.

7. The device of claim 1 wherein said means for observing an optical change comprises a window restricting the field of view to a portion of said vessel.

8. The device of claim 1 wherein said vessel comprises a capillary tube and said means for observing an optical change comprises the restriction of view to the end of said capillary tube.

9. The device of claim 1 wherein said fluid medium is an electrolyte and wherein a second medium that has an electrical conductivity is present within said electrolyte.

10. The device of claim 9 wherein said medium with electrical conductivity comprises a metal.

11. The device of claim 10 wherein said metal comprises gold.

12. The device of claim 10 wherein said metal comprises mercury.

* * * * *

UNITED STATES PATENT AND TRADEMARK OFFICE
CERTIFICATE OF CORRECTION

PATENT NO. : 4,417,786

DATED : November 29, 1983

INVENTOR(S) : Gerardo Beni and Susan Hackwood

It is certified that error appears in the above-identified patent and that said Letters Patent is hereby corrected as shown below:

Column 1, line 39, "electrophorectic" should read --electrophorectic devices--.

Signed and Sealed this

Twenty-second Day of May 1984

[SEAL]

Attest:

GERALD J. MOSSINGHOFF

Attesting Officer

Commissioner of Patents and Trademarks